United States Patent

[11] 3,603,232

| [72] | Inventor | Richard B. Jones<br>Highland, Calif. |
|---|---|---|
| [21] | Appl. No. | 755,325 |
| [22] | Filed | Aug. 26, 1968 |
| [45] | Patented | Sept. 7, 1971 |
| [73] | Assignee | Perfect Film & Chemical Corporation<br>New York, N.Y. |

[54] CASSETTE CAMERA
4 Claims, 12 Drawing Figs.

[52] U.S. Cl. .................................................. 95/31 R,
  95/11 R, 95/34
[51] Int. Cl. ...................................................... G03b 17/04,
  G03b 19/04
[50] Field of Search ............................................. 95/11, 31,
  34

[56] References Cited
UNITED STATES PATENTS

| 2,257,424 | 9/1941 | Mener.......................... | 95/31 |
| 2,409,605 | 10/1946 | Bolsey.......................... | 95/31 |
| 2,911,894 | 11/1959 | Hennig et al.................. | 95/34 X |
| 2,927,518 | 3/1960 | Dorr............................. | 95/34 X |
| 3,247,773 | 4/1966 | Doblin et al................... | 95/31 |

FOREIGN PATENTS

| 1,024,724 | 4/1966 | Great Britain................ | 95/31 |

Primary Examiner—Samuel S. Matthews
Assistant Examiner—Joseph F. Peters, Jr.
Attorney—Kenneth S. Goldfarb ABSTRACT: A small pocket size camera snapped on or off a conventional roll-type film cartridge or cassette having a winding knob attached thereto but movable to operative position and a finger actuated positioning pin temporarily releaseable from conventional film metering apertures to permit film advancement until next automatic engagement in a following aperture. The camera of conventional box-type, lens and shutter is modified outwardly to conceal the winding knob, permit collapse of the positioning pin, align camera and retractible viewfinder for conforming packaging shape. The winding knob camera attachment may form a clutch means.

PATENTED SEP 7 1971 3,603,232

INVENTOR.
RICHARD B. JONES
BY LIONEL V. TEFFT
Attorney

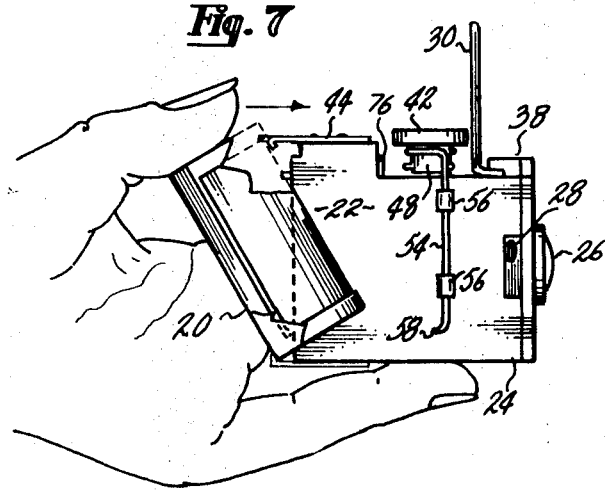
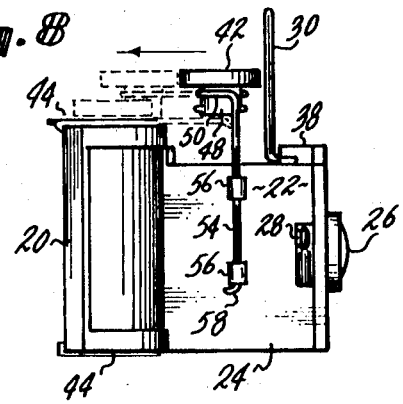
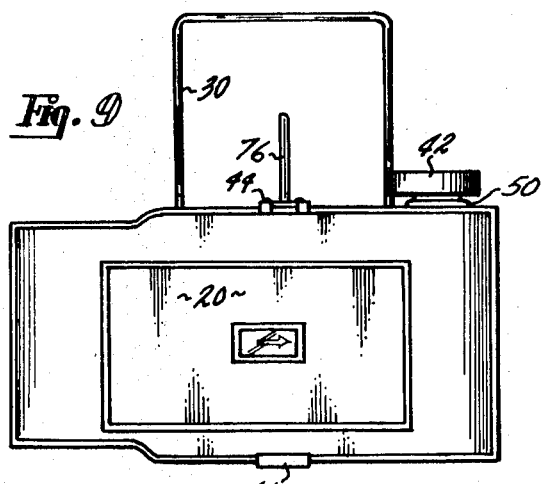
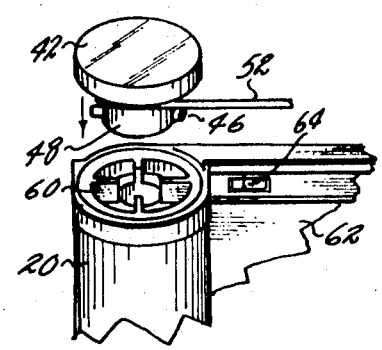
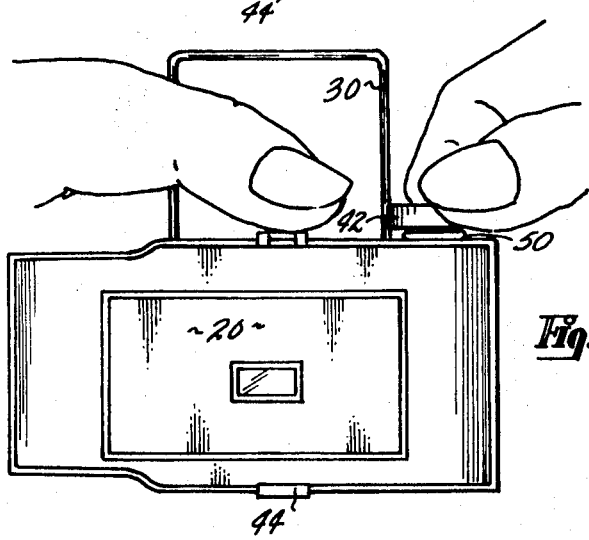
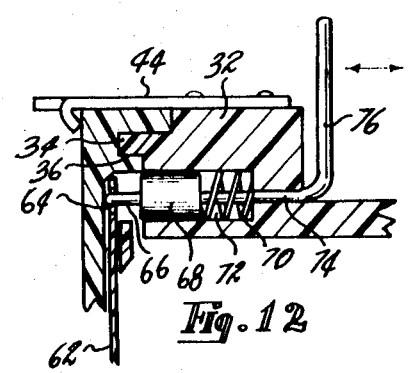
INVENTOR.
RICHARD B. JONES
BY
LIONEL V. TEFFT
Attorney

CASSETTE CAMERA

One of the main objects of the main invention is to provide a simple conventional camera body, lens and shutter that can be detachably and operably connected to a conventional cassette by means of an attached but movable winding knob and direct finger actuated film positioning pin.

Another object of the invention is to detachably associate a conventional cassette and a small pocket size camera conventional in all respects except for an attached movable winding knob and a simple finger actuated, spring pressed film positioning pin.

Still another object of the invention is to modify the camera body to conceal the winding knob and permit collapse of retractible elements to insure easy and conforming packaging.

Yet another object of the invention is to provide the simplest type of camera, lens and shutter with a snap detachable connection on a conventional cassette, the connection including a clutch-type attached but moveable winding knob on the camera and a simple cassette film aperture engaging finger actuated but automatically operating positioning and metering pin.

The prior art as respects the present invention is perhaps best represented by the J. Doblin et al. Pat. No. 3,247,773, Apr. 26, 1966. The theory of camera attachability to a conventional cassette is disclosed in this patent. The mechanism shown is complicated. The winding knob and clutch are separately attached and may be easily lost. A film metering device is actuated in connection with the shutter mechanism. The device is not designed for assembly at low cost or easy conforming packaging.

It is obvious that a simple pocket size snap-on camera of this general type must be made at extremely low cost and sold at a low price. This is the fundamental theory of applicant's invention and he has produced a cassette camera that is attached and made operatively engageable on a conventional cassette with relatively few and simple parts and with no chance of losing the winding knob. The physical engagement is quick and partially automatic. The dual finger actuation of the positioning pin and winding knob is simple, easy but positive and accurate.

These and other objects and advantages of the present invention will become apparent to those skilled in the art upon consideration of the following detailed description of the preferred embodiment thereof, reference being made to the accompanying drawings, herewith wherein:

FIG. 7 is a schematic view showing manner of manual attachment of the camera and film cartridge;

FIG. 8 is a schematic view showing the manner of winding knob actuation to operating position;

FIG. 9 is a rear elevational view of the device;

FIG. 10 is a schematic view showing finger position for release of film positioning pin and winding knob actuation;

FIG. 11 is a partial perspective view of the winding knob swung to overhead film cartridge attaching position; and FIG. 12 is a sectional view taken on the line 12—12 of FIG. 3.

Figure 1:
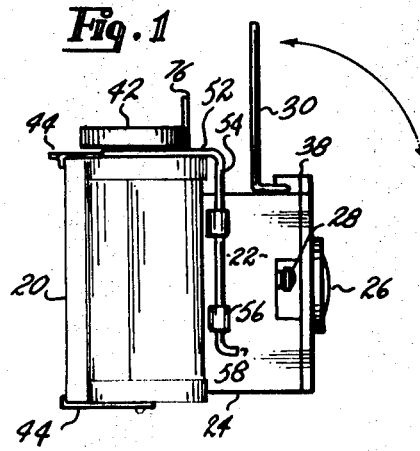
FIG. 1 is a side elevational view of the cassette attached camera in operating position.
Figure 2:
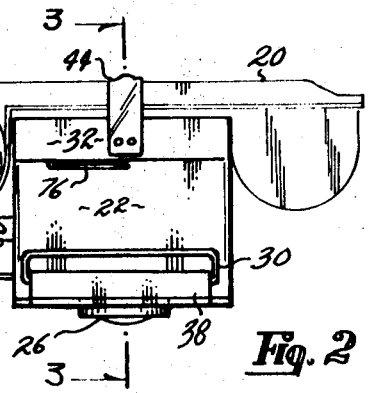
FIG. 2 is a plan view from above of FIG. 1.

Before referring specifically to the drawings, it should be explained that the film cartridge or cassette is entirely conventional and known to amateur photographers throughout the world. The small cassette attachable and detachable camera assumes a modified shape for assembly, packaging and improved use reasons but actually it is nothing more than the conventional type of box camera with the simplest and cheapest kind of lens and shutter arrangement. No claim whatsoever is made for these elements or even their detachability which is shown in the prior art especially in the J. Doblin et al. Pat. No. 3,247,773, Apr. 26, 1966.

However, the manner of associating the above elements in a quick and easily operable manner with simple structure and at remarkably low cost is entirely new. It is fundamental in applicant's device that a finger releaseable film positioning pin be arranged for actuation just before the camera attached film winding knob has commenced manual movement. There are modifications of structure which merit protection but they are less important and will be set forth in detail later.

A preferred embodiment of the invention is disclosed in the drawing in which a conventional film cartridge or cassette has been referred to as 20. This roll-type film cartridge has been described in detail in prior patents and is available and sold to amateur photographers everywhere as a separate unit. It requires no detailed explanation. The detachable camera generally referred to as 22 has an open rear ended box portion 24, a lens 26 and the simplest of shutter mechanisms 28. A retractible viewfinder 30 might be attached other than as shown. An elevated rib 32 on the top of the camera box has a tongue 34 that engages a conventional groove 36 in the cassette 20 to form a camera body and corner light trap. The top of the camera body or box is also ribbed forwardly at 38 to provide completely aligned view through the finder and also to provide a well 40 in which a film winding knob 42 finds conforming concealment when packaged for shipment and sale. A pair of spaced upper and lower spring-type latch members 44 provide a well-known attaching and detaching connection with the cassette as shown in FIGS. 7 and 8.

The winding knob 42 has its spaced projecting lugs 46 attached the hub 48 encircled by a wire loop 50. The loop 50 has a horizontal extension 52 and a vertical defending portion 54 that is loosely and rotatably secured to the camera body or box by means of the spaced apertured supports or bearings 56 and bent end 58.

It is believed obvious that the winding knob may be manually quickly elevated from its well 40 and rotated over and into operative engagement with the ribbed conventional portion 60 of the film cartridge or cassette as shown in FIGS. 7, 8, 11, 1 and 2. When the winding knob 42 is in operative position, it may be finger manipulated to advance film in the usual manner in one direction but the hub encircling loop 50 acts as a clutch to prevent unwinding and some film release when the fingers are removed.

Figure 3:
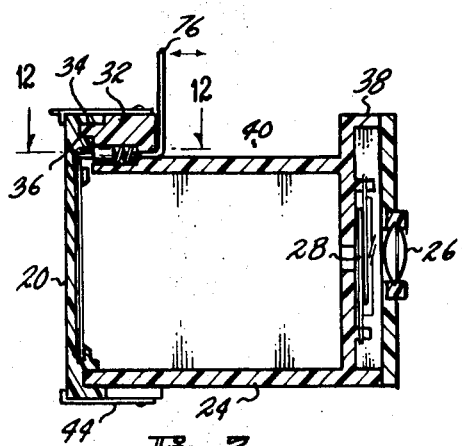
FIG. 3 is a sectional view taken on the line 3—3 of FIG. 2.
Figure 4:
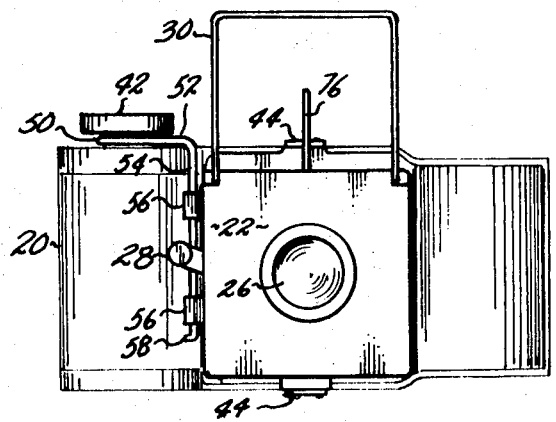
FIG. 4 is a front elevational view of the device of FIG. 1.
Figure 5:
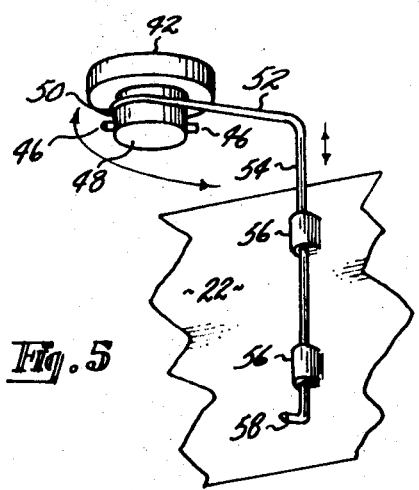
FIG. 5 is an enlarged perspective portional view of the camera attached film winding knob.
Figure 6:
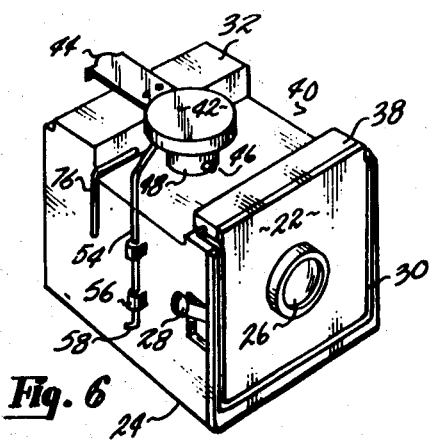
FIG. 6 is a perspective view of the detached camera portion.

A simple finger actuated means is provided for film positioning in the proper frame. The film 62 in the cassette 20 has conventional metering apertures 64 which are adapted to be intermittently engaged by a positioning pin 66, FIGS. 3 and 12. The pin 66 is guided by a cylinder 68 spring mounted at 70 in a bore 72 in the rear body rib 32. An extension 74 of the pin 66 extends through the rib 32 and has finger actuating end 76 collapsibly mounted as shown in FIGS. 6 and 12. It is believed apparent that the positioning pin 66 will automatically be pressed into one of the film metering apertures to station the film in picture taking position but must be finger released temporarily to permit finger rotation of the winding knob to the next picture framing position.

The structural elements are extremely simple and their operation is believed perfectly obvious. The low cost of manufacture and packaging puts the device in the hands of everyone. The fact that the winding knob support on the camera prevents detachment and loss is important. Its clutch operation and concealment for packaging is unique. The conventional camera body is modified and the positioning pin attached thereto so that an overall conformity permits simple, easy and low cost packaging. The simple and entirely new film positioning pin for this type of camera is new. This is probably the first pocket-type camera that has been associated in a practical manner with a cassette type film cartridge to produce a much desired result at an absolute minimum of cost.

I claim:

1. A cassette attachable small camera, comprising a roll-type film cassette cartridge having a film advancing mechanism, said camera having a body and having a detachable connecting means thereon for quick engagement with said cassette cartridge, and means for operatively associating said camera and said cassette cartridge, including a film winding knob connected to said camera and moveable to operative position on said cassette cartridge, said winding knob being sufficiently loose to permit said knob to swing over and into operative engagement with said film advancing mechanism, said body having a positioning pin therein automatically engaging said film advancing mechanism, said pin being finger activated for temporary release to permit film advancement by said winding knob.

2. A device as set forth in claim 1 in which the connection includes a wire portion looped about the winding knob to act as a clutch and prevent film unwinding.

3. A device as set forth in claim 1 in which the camera body provides a recess to conceal the winding knob.

4. A device as set forth in claim 1 in which front and back elevations on the camera body top form a well for the attached winding knob, camera view aligning means and a conforming packaging device.

UNITED STATES PATENT OFFICE
CERTIFICATE OF CORRECTION

Patent No. 3,603,232      Dated September 7, 1971

Inventor(s) Richard B. Jones

It is certified that error appears in the above-identified patent and that said Letters Patent are hereby corrected as shown below:

On the cover sheet [73] "Perfect Film & Chemical Corporation, New York, N. Y." should read -- Assignor, by mesne Assignments to GAF Corporation, a corporation of Delaware --.

Signed and sealed this 14th day of March 1972.

(SEAL)
Attest:

EDWARD M. FLETCHER, JR.      ROBERT GOTTSCHALK
Attesting Officer      Commissioner of Patents